(12) United States Patent
Schreter

(10) Patent No.: US 11,157,370 B2
(45) Date of Patent: Oct. 26, 2021

(54) CONSISTENT BACKUP OF A DISTRIBUTED DATABASE SYSTEM

(71) Applicant: SAP SE, Walldorf (DE)

(72) Inventor: Ivan Schreter, Malsch (DE)

(73) Assignee: SAP SE, Walldorf (DE)

( * ) Notice: Subject to any disclaimer, the term of this patent is extended or adjusted under 35 U.S.C. 154(b) by 123 days.

(21) Appl. No.: 15/335,770

(22) Filed: Oct. 27, 2016

(65) Prior Publication Data

US 2017/0046231 A1 Feb. 16, 2017

Related U.S. Application Data

(63) Continuation of application No. 13/161,780, filed on Jun. 16, 2011, now Pat. No. 9,507,841.

(51) Int. Cl.
*G06F 11/14* (2006.01)
*G06F 16/27* (2019.01)

(52) U.S. Cl.
CPC ...... *G06F 11/1464* (2013.01); *G06F 11/1461* (2013.01); *G06F 16/27* (2019.01); *G06F 2201/80* (2013.01); *G06F 2201/82* (2013.01); *G06F 2201/84* (2013.01)

(58) Field of Classification Search
CPC .. G06F 11/1464; G06F 16/27; G06F 11/1461; G06F 2201/84; G06F 2201/80; G06F 2201/82
See application file for complete search history.

(56) References Cited

U.S. PATENT DOCUMENTS

| | | | | |
|---|---|---|---|---|
| 6,560,615 | B1* | 5/2003 | Zayas | G06F 11/1451 707/646 |
| 7,127,577 | B2* | 10/2006 | Koning | G06F 11/1464 711/162 |
| 7,743,205 | B2* | 6/2010 | Massey | G06F 3/0605 360/71 |
| 9,111,015 | B1* | 8/2015 | Ranade | G06F 16/17 |
| 2006/0230079 | A1* | 10/2006 | Strahl | G06F 11/1435 |
| 2007/0185938 | A1* | 8/2007 | Prahlad | G06F 17/30212 |
| 2007/0192273 | A1* | 8/2007 | Hempelmann | G06F 17/30377 |
| 2009/0210458 | A1* | 8/2009 | Glover | G06F 11/1451 |

* cited by examiner

*Primary Examiner* — Charles D Adams
(74) *Attorney, Agent, or Firm* — Buckley, Maschoff & Talwalkar LLC

(57) ABSTRACT

In an executing database instance including a plurality of database nodes, creation of a backup of the executing database instance includes creation of a current savepoint in one of the plurality of database nodes by storing first modified pages of a cache of the database node in a datastore of the database node, transmitting a confirmation after storing the first modified pages, repeatedly identifying second modified pages of the cache and storing the identified second modified pages in the datastore, receiving an instruction to enter a critical phase and stopping the repeated identifying and storing in response to the instruction, blocking updates to the database node and transmitting a second confirmation, and receiving a second instruction and, in response to receiving the second instruction, identifying third modified pages of the cache and storing the third modified pages of the cache in the datastore. Pages associated with the current savepoint are identified and stored in the datastore, and the pages associated with the current savepoint are stored in a persistent media.

17 Claims, 7 Drawing Sheets

420

```
┌─────────────────────────────────────┐
│   Pages 0-1,999 | Block: 3/19       │
├─────────────────────────────────────┤
│   PageNo: 111   Block 1/300         │
├─────────────────────────────────────┤
│   PageNo: 112   Block 2/2350        │
└─────────────────────────────────────┘

┌─────────────────────────────────────┐
        │   Pages 2,000-3,999 | Block: 2/9876 │
        ├─────────────────────────────────────┤
        │   PageNo: 2111   Block 1/50         │
        ├─────────────────────────────────────┤
        │   PageNo: 2112   Block 3/5502       │
        └─────────────────────────────────────┘

┌─────────────────────────────────────┐
                │   Pages 4,000-5,999 | Block: 1/5004 │
                ├─────────────────────────────────────┤
                │   PageNo: 4111   Block 1/5120       │
                ├─────────────────────────────────────┤
                │   PageNo: 4112   Block 2/4550       │
                └─────────────────────────────────────┘

┌─────────────────────────────────────┐
                        │   Pages 6,000-7,999 | Block: 2/4711 │
                        ├─────────────────────────────────────┤
                        │   PageNo: 6111   Block 2/3400       │
                        ├─────────────────────────────────────┤
                        │   PageNo: 6112   Block 2/350        │
                        └─────────────────────────────────────┘
```

*FIG. 5*

CONSISTENT BACKUP OF A DISTRIBUTED DATABASE SYSTEM

FIELD

Some embodiments relate to database systems. In particular, some embodiments concern systems for backing up a distributed database.

BACKGROUND

Many database systems allow administrators or other authorized users to restore a database in the event of a database crash or other error. For example, a database system may employ a "shadow paging" system, in which a "last known good" version of a database is maintained within the database despite subsequent changes to the database. In the event of a crash, the last known good version is retrieved from the database and brought up to date (i.e., to the time of the crash) using data from a transaction log which is also stored in the database. The foregoing process limits the downtime needed for generating backups and for restoring the database from a stored previous version. However, the process requires that the last known good version and transaction log can be retrieved from the media in which the database is stored.

In order to provide recovery from media failure or other catastrophic failure, a database system may back up its data to a backup medium which is physically separate from the database system's storage media (e.g., one or more hard disks and/or Random Access Memory). In the event of a hardware failure, and if the database is backed up daily to a separate backup medium, an administrator may restore the database to a previous day's state by retrieving the previous day's data from the backup medium.

In a traditional "single node" database system, which consists of a single executing process and associated storage media, any full backup thereof represents a single consistent state of the database. A distributed database, on the other hand, consists of two or more nodes, each of which consists of a single executing process and associated storage media. The data stored in the storage media of all the nodes, taken together, represents the full database.

If each node of a distributed database is backed up as described above with respect to a single node database system, the backup of each node will represent a single consistent state of the node. Even if the backups of each node are commenced simultaneously, the backups of all the nodes will most likely not correspond to a single consistent state of the full database due to ongoing database transactions and a lack of synchronization between the nodes. Therefore, in order to ensure that the backups of all the nodes correspond to a single consistent state of the full database, each node of the distributed database must be stopped, and, after all nodes are stopped, each node is backed up. Each node is restarted only after the backup of all nodes is complete.

The full database is unavailable during the latter backup procedure described above. This downtime is significant and unacceptable in many scenarios. Systems are desired to backup distributed databases in an efficient manner which limits database downtime.

BRIEF DESCRIPTION OF THE DRAWINGS

FIG. 5 illustrates portions of converter leaf pages according to some embodiments.

DETAILED DESCRIPTION

Figure 1:
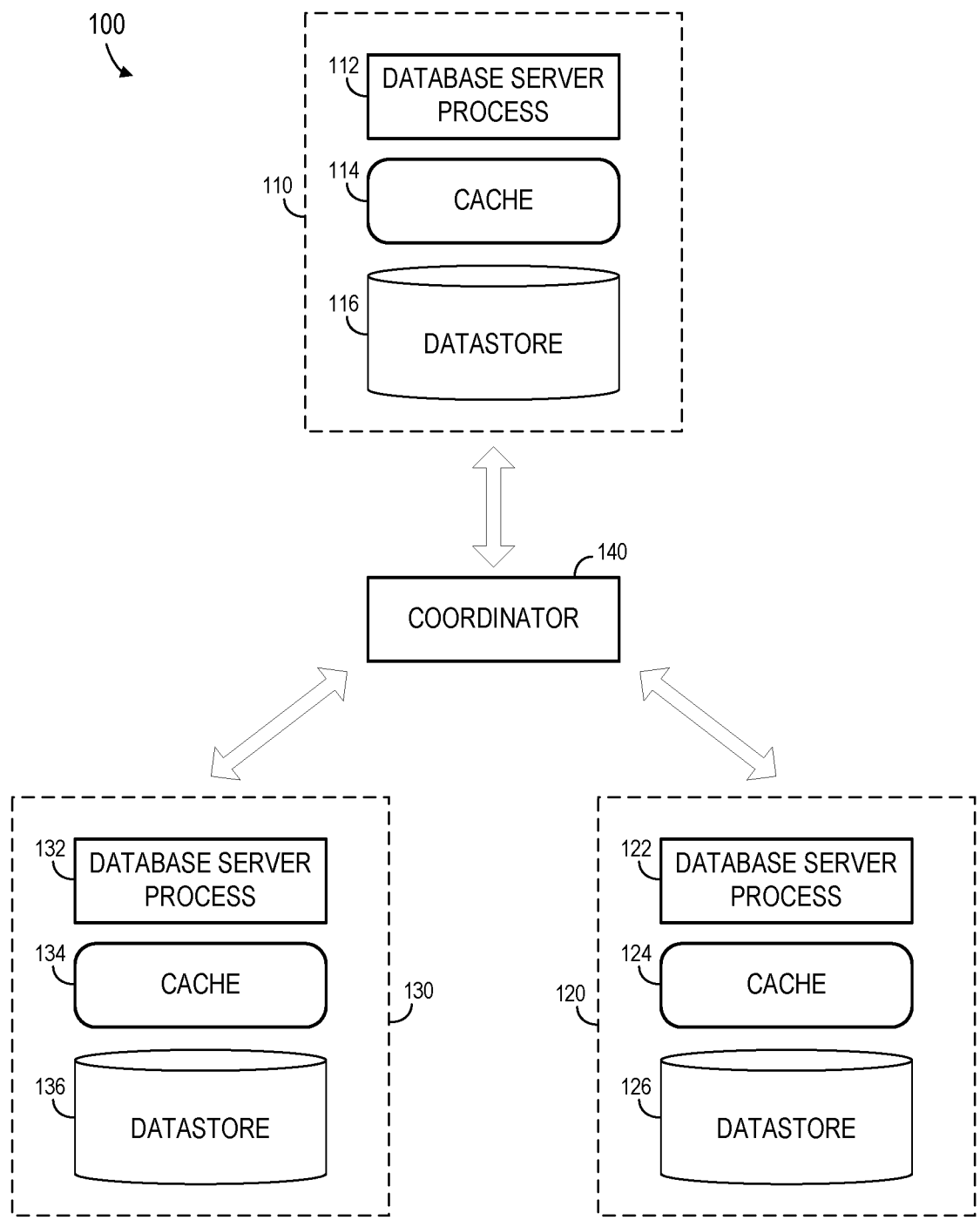
FIG. 1 is a block diagram of a distributed database system according to some embodiments.

FIG. 1 is a block diagram of executing database instance 100 according to some embodiments. As shown, database instance 100 comprises a distributed database. The present description will assume that a distributed database consists of two or more database nodes, each of which includes at least one operating system process, a cache and a datastore. The terms "database" and "database instance" will be used interchangeably below.

According to the present example, database instance 100 includes database nodes 110, 120 and 130. Each node includes a respective database server process, a cache and a datastore. The data of datastores 116, 126 and 136, taken together, represent the full database of database instance 100. The corresponding database server processes 112, 122 and 132 operate to transparently provide the data of the full database to database applications.

In some embodiments, each of caches 114, 124 and 134 is implemented in Random Access Memory (RAM), and each of datastores 116, 126 and 136 is implemented in one or more fixed disks. Alternatively, one or more of nodes 110, 120 and 130 may implement an "in-memory" database, in which both the data of the datastore and the cache are stored in volatile (e.g., non-disk-based) memory (e.g., RAM). In some embodiments, the data may comprise one or more of conventional tabular data, row-based data, column-based data, and object-based data. Database instance 100 may also or alternatively support multi-tenancy by providing multiple logical database systems which are programmatically isolated from one another.

Database instance 100 also includes coordinator 140. Coordinator 140 may comprise a process and/or a device executing this process. Generally, coordinator 140 communicates with database nodes 110 through 130 in order to generate a consistent backup of distributed database instance 100. Details of this communication according to some embodiments will be described below. Coordinator 140 may be implemented by a device separate from nodes 110, 120 and 130, or by one or more of nodes 110, 120 and 130.

Database instance 100 may communicate with one or more database applications (not shown) over one or more interfaces (e.g., a Structured Query Language (SQL)-based interface). The database applications may provide, for example, business reporting, inventory control, online shopping, and/or any other suitable functions. The database applications may, in turn, support client applications that may be executed by client devices. Such a client application may simply comprise a Web browser to access and display reports generated by a database application.

The data of database instance 100 may be received from disparate hardware and software systems, some of which are not interoperational with one another. The systems may comprise a back-end data environment employed in a business or industrial context. The data may be pushed to database instance 100 and/or provided in response to queries received therefrom.

Database instance 100 and each element thereof may also include other unshown elements that may be used during operation thereof, such as any suitable program code, scripts, or other functional data that is executable to interface with other elements, other applications, other data files, operating system files, and device drivers. These elements are known to those in the art, and are therefore not described in detail herein.

Figure 2:
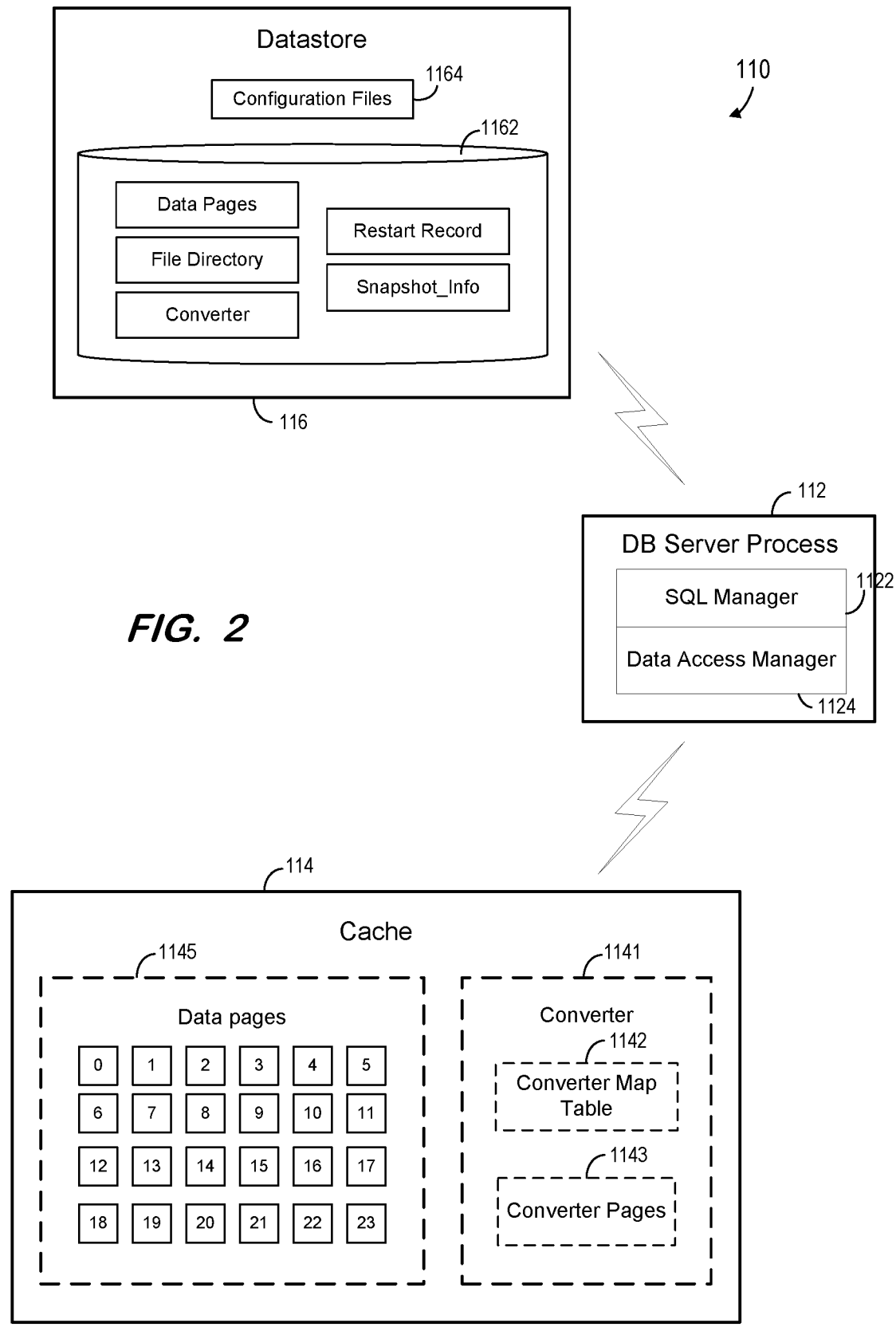
FIG. 2 is a block diagram of a database node according to some embodiments.

FIG. 2 is a block diagram of database node 110 of database instance 100 according to some embodiments. As illustrated, database node 110 includes database server process 112, cache 114 and datastore 116.

For purposes of the foregoing description, it will be assumed that datastore 116 comprises only data volume 1162. Datastore 116 may comprise one or more data volumes in some embodiments, with each of the one or more data volumes comprising one or more disparate physical systems for storing data. These physical systems may comprise a portion of a physical hard disk, an entire physical hard disk, a storage system composed of several physical hard disks, and/or RAM.

Generally, a data volume is subdivided into storage areas known as blocks, and data is stored in the data volume in data pages having the same size as a block. Accordingly, a particular data page of datastore 116 may be accessed by referencing the data volume and block address associated with that data page. The data pages may include application data consisting of tabular data, row-based data, column-based data, object-based data and associated index entries. In a case that datastore 116 includes more than one data volume, the data pages may be spread across one or more of its data volumes.

Data volume 1162 includes a file directory and a converter. If datastore 116 includes more than one data volume, the file directory and the converter may be spread across one or more of the data volumes. When a new data page is created, the data page is assigned a unique logical page number. The converter maps this logical page number to the data volume and block address at which the data page is stored. The file directory maps a file identifier to a logical page number of a corresponding file root page, and the aforementioned database catalog maps each file identifier to associated metadata, including a name of a database object associated with the file identifier. Accordingly, the information of the database catalog and the file directory may be used to determine a logical page number from a name of a database object, for example. Once the page number is known, the converter may be used to determine a block address at which a root page of the database object is stored.

The foregoing process also applies to "in-memory" implementations. However, an identifier of a data volume in which a data page is stored might not be utilized in such implementations, as the in-memory datastore might simply comprise addressable memory locations which are not divided into logical data volumes.

Datastore 116 may also include configuration files 1164 defining properties of database node 110 (e.g., a size and physical location of each data volume, a maximum number of data volumes in datastore 116, etc.). Moreover, datastore 116 typically includes system files, database parameters, paths, user information and any other suitable information.

Datastore 116 may also store a database catalog including metadata describing the database objects that are stored therein.

DB server process 112 may comprise any system for managing a distributed database instance that is or becomes known. Generally, DB server process 112 may receive requests for data (e.g., SQL requests from a database application), may retrieve the requested data from datastore 116 or from cache 114, and may return the requested data to the requestor. In some embodiments, DB server process 112 includes SQL manager 122 to process received SQL statements and data access manager 124 to manage access to stored data. DB server process 112 may also perform start-up, logging, recovery, management, optimization, monitoring, indexing, integrity checks and other database-related tasks.

Frequently, SQL commands received from database applications will require the modification of data stored in a database, or addition of data to the database. When information stored in the database is to be modified, the data is retrieved from data volume 1162 and manipulated in cache 114. Once the data manipulation is complete (or after a series of manipulations has completed), the modified data is written from cache 112 to data volume 1162 to update the database. Further, a log entry indicating the modifications may be written in data volume 1162 (e.g., to allow the database to be restored to a consistent state if an error occurs).

Cache 114 stores various elements of datastore 116 during execution of database node 110. These elements may include recently-accessed pages of application data, converter pages, database catalog objects and/or a log queue.

Cache 114 includes converter 1141 and data pages 1145. Converter 1141 and data pages 1145 are illustrated separately herein for the sake of clarity. However, according to some embodiments, converter 1141 and data pages 1145 might not comprise separate, contiguous memory addresses of I/O buffer cache 130. For example, converter pages 1143 may be interspersed among data pages 1145 throughout cache 114.

Generally, cache 1145 stores pages from data volume 1162 that have been recently read or write-accessed. If a database transaction requires modification of a page, the page is read from a block address of data volume 1162 specified in the file directory, the page is modified, and a log entry describing the modification is recorded. The modified page is stored in cache 114, the modified page is designated as modified, and the original "last known good" page remains at the block address of data volume 1162 from which it was read. Once the number of modified pages in cache 114 reaches a threshold amount, or after passage of a designated time interval, all pages of cache 114 which are designated as modified are written to data volume 1162.

A modified page is not written to the block address of data volume 1162 from which it was initially read. Rather, the original unmodified page remains designated as a "last known good" page at its block address and the modified page is written to a new block address of data volume 1162.

A savepoint is executed to convert the modified pages stored in data volume 1162 to "last known good" pages and frees the blocks used by the existing "last known good" pages, so that pages may be written thereto. At a savepoint, all pages designated as modified in cache 114 are written to data volume 1162 as described above. Once all modified pages are written to data volume 1162, the "last known good" pages associated with the modified pages are released so that their associated block addresses may be overwritten.

As mentioned above, the converter of data volume 1162 maps logical page numbers to block addresses of data volume 1162. Accordingly, the converter must be modified once a corresponding data page is saved to a new location of data volume 1162. The modified converter pages are flushed to data volume 1162 at the end of a savepoint, particularly after all modified data pages are written. Then, a restart record is created to point to the starting point of the newly-saved converter within data volume 1162. The restart record may be stored in any volume of datastore 116.

In case of a system crash, the modified pages stored in data volume 1162 are ignored and data volume 1162 is reconstructed based on the restart record, the converter pages identified from the restart record, the "last known good" pages (which are identified by the converter pages), and the log entries (which reflect page changes since the last savepoint).

U.S. Pat. No. 7,440,979, entitled Snapshots For Instant Backup In A Database Management System, describes a system in which, at some savepoints, the previous "last known good" pages are not freed for overwriting. Rather, these data pages are marked, tagged, or otherwise identified as being part of a snapshot. Accordingly, these pages will not be overwritten until a command to remove the snapshot is received. These snapshot pages include pages storing application data (e.g., tabular data, row-based data, column-based data, object-based data and associated index entries) as well as converter pages pointing thereto. A "snapshot restart record" pointing to the starting point of this converter is also created. Consequently, data volume 1162 may be reconstructed based on the snapshot restart record, the converter pages identified from the snapshot restart record, and the "last known good" data pages of the snapshot (which are identified by the identified converter pages).

Figure 3A:
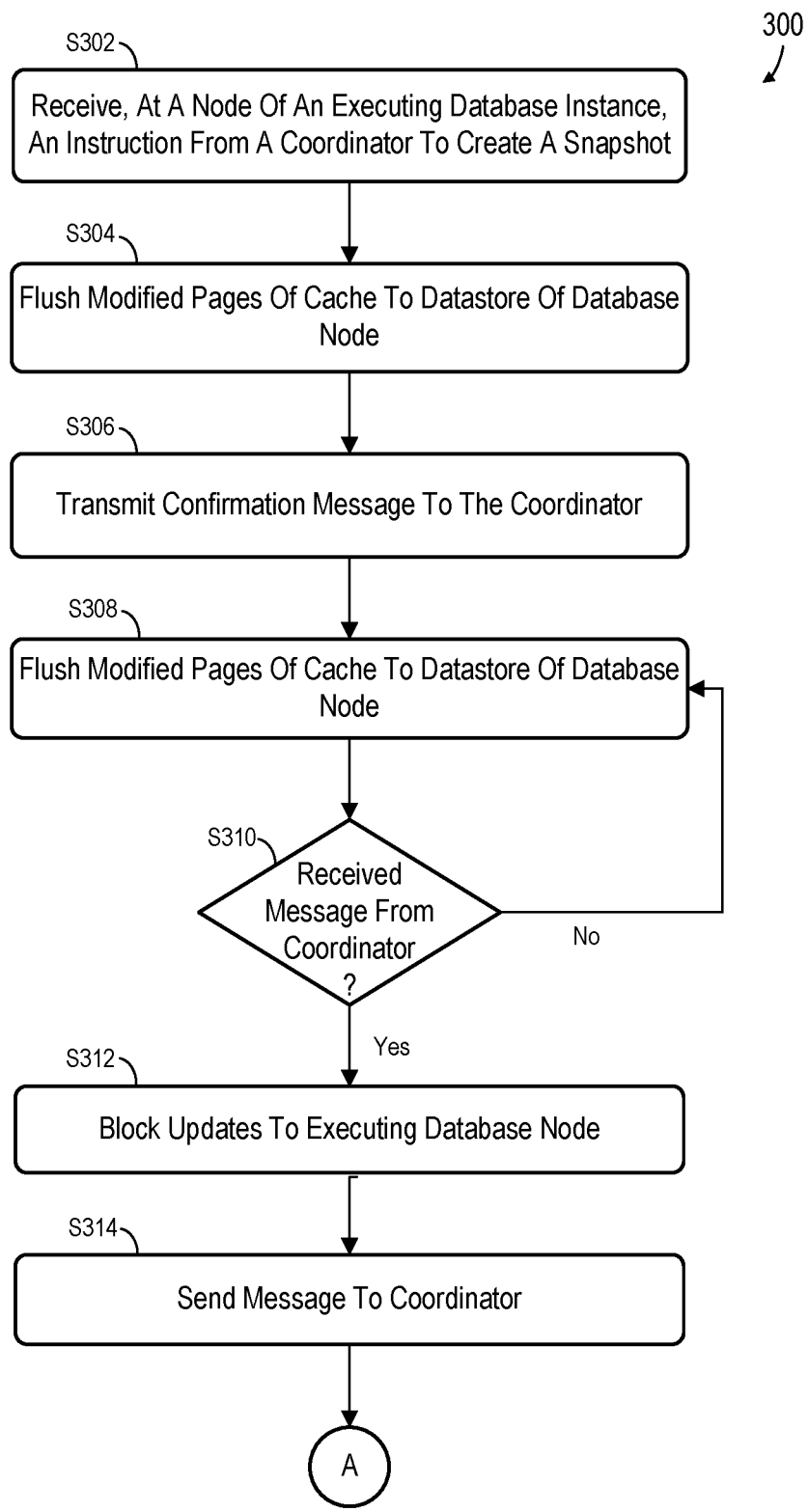
FIGS. 3A and 3B comprise a flow diagram of a process according to some embodiments.
Figure 3B:
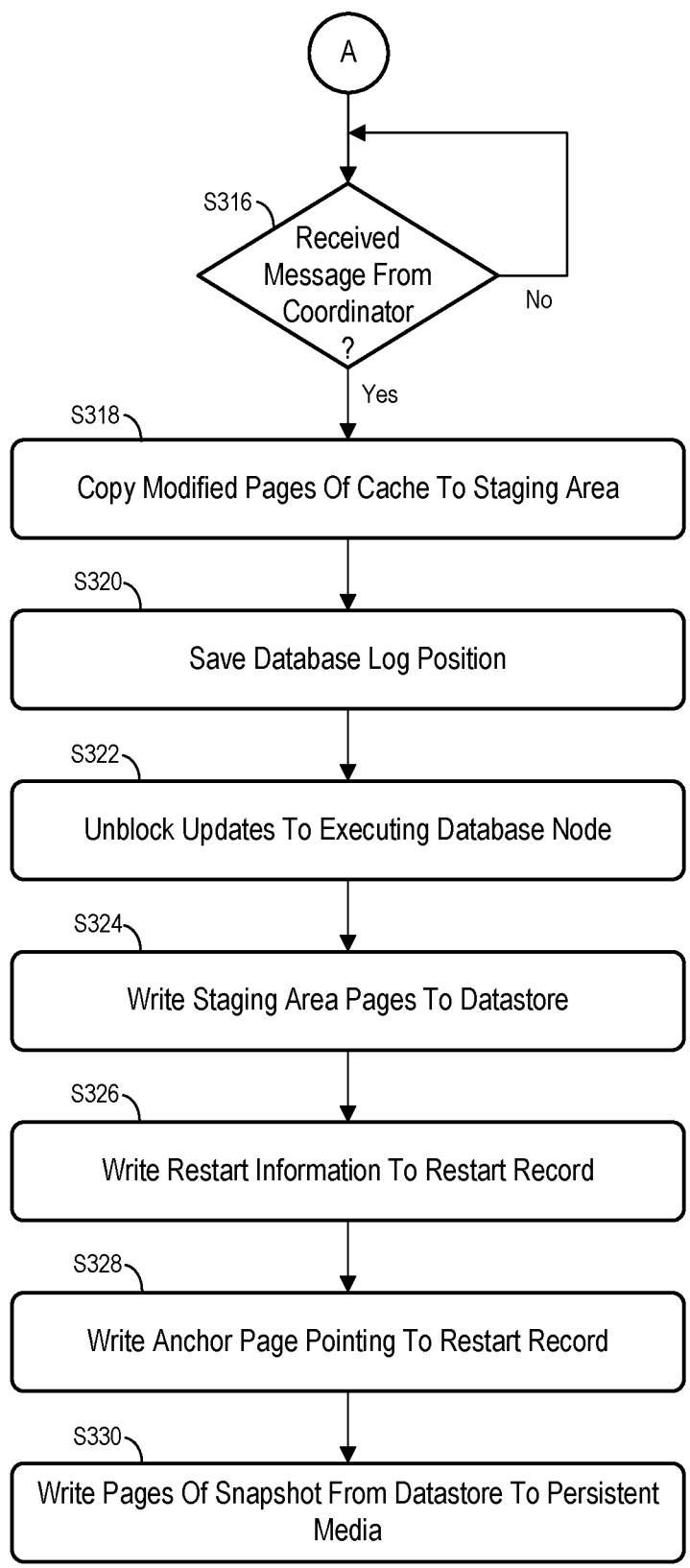

FIGS. 3A and 3B comprise a flow diagram of process 300 according to some embodiments. Some embodiments of process 300 may provide efficient backup of a multi-node distributed database. In some embodiments, various hardware elements of a database node execute program code to perform process 300. Process 300 may be performed in response to a predefined schedule, a command received from a database manager (not shown), or any other trigger event.

Process 300 and all other processes mentioned herein may be embodied in computer-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

During a backup of a distributed database according to some embodiments, process 300 is independently and contemporaneously executed by each node of the distributed database. However, for the sake of clarity, process 300 will be described with respect to its execution by a single database node of a multi-node database.

Figure 4:
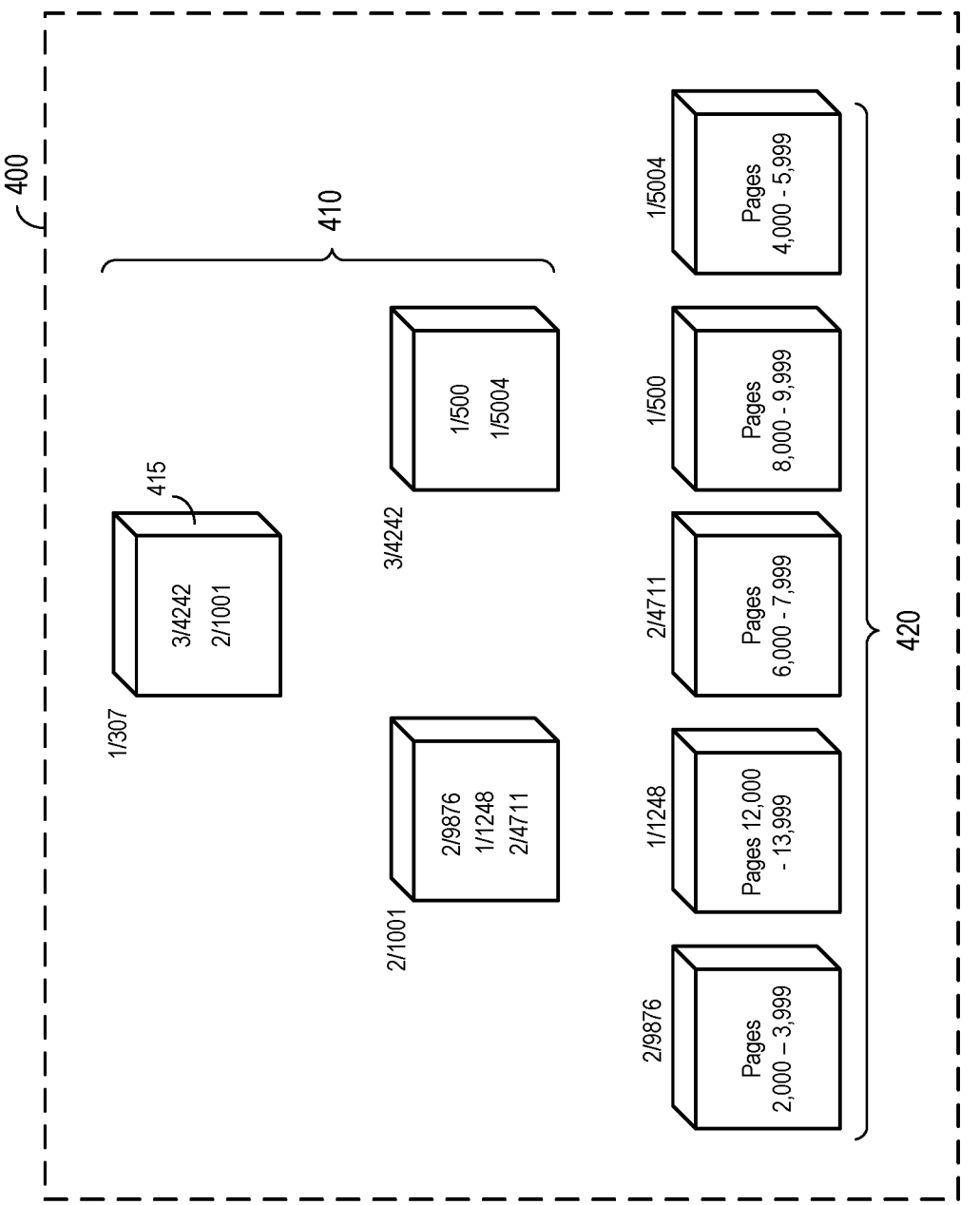
FIG. 4 illustrates a converter stored in a data area according to some embodiments.

To better convey the foregoing example of process 300 according to some embodiments, FIGS. 4 and 5 illustrate examples of various elements of a database node prior to process 300. Such a database node includes datastore 400 of FIG. 4, which stores converter index pages 410 and converter leaf pages 420 of a converter. Storage locations of converter index pages 410 and converter leaf pages 420 are identified using the convention "volume number/block address", and FIG. 4 thereby indicates that datastore 400 consists of at least three data volumes. As mentioned above, embodiments are not limited to database nodes having more than one data volume.

According to the present example, converter leaf pages 420 of FIG. 4 represent the "last known good" converter pages which were identified at the completion of a last savepoint. Index pages 410 may be used to locate a converter page 420 and to locate a data page in datastore 400 based on the located converter page 420. Each index page 410 includes block addresses of one or more other index pages or of a converter page 410. By virtue of this arrangement, any of converter pages 410 (and any associated data pages) may be located in datastore 400 based only on the block address of converter root page 415.

FIG. 5 illustrates portions of some of converter leaf pages 420 according to some embodiments. Each of converter leaf pages 420 identifies a range of logical page numbers with which it is associated, and a block address at which it is stored. A converter leaf page 420 also associates a block address with each data page having a logical page number in the range of the converter leaf page 420.

The node including datastore 400 continues to operate after the savepoint, during which data pages are loaded into the cache of the node and modified. Then, at S301 of process 300, the node receives an instruction to create a snapshot. The instruction is received from a coordinator and is transmitted to each node of the database instance. As mentioned above, the coordinator may transmit the instruction according to a predefined schedule, in response to a command received from a database manager (not shown), or in response to another event. As also mentioned above, the remaining steps of process 300 will be described with respect to a single node, but it should be understood that each node of the database instance executes the remaining steps of process 300 in response to the received instruction.

At S304, the modified pages currently residing in the cache are "flushed" to the datastore of the database node. Flushing comprises writing the modified pages in the cache to the datastore (e.g., datastore 400), releasing the "last known good" pages which are associated with the same logical page numbers as the modified pages, and designating the written modified pages as "last known good". Moreover, appropriate pages of the cached converter are modified to reflect the new locations of the data pages within the datastore, the modified converter pages are written to new locations of the datastore, the "last known good" versions of these converter pages are released, and the written modified converter pages are designated as "last known good".

The node transmits a confirmation message to the coordinator at S306. Since the node is currently executing and servicing requests from applications, etc., data pages begin to repopulate the cache and may be modified as soon as the modified pages are flushed at S304. Accordingly, any modified pages in the cache are repeatedly flushed as described above at S308 until a message is received from the coordinator at S310.

As mentioned, each node of the database instance begins process 300 in response to receiving an instruction from the coordinator. The coordinator then waits to receive a confirmation message which is transmitted from each database node when those nodes reach S306 of process 300. In this regard, each database node may reach S306 at a different point in time. After receiving a confirmation message from each of the database nodes of the database instance, the coordinator sends a message to all of the database nodes to enter a "critical phase".

Upon receiving this message at S310, the repetitive flush of S308 terminates and updates to the database node are blocked at S312. According to some embodiments, process 300 prevents concurrent write operations at S312 by acquiring the "consistent change lock" in exclusive mode, and the write operations of the datastore interface acquire the consistent change lock in shared mode. Moreover, a transaction manager is instructed to not start or close any write transactions. A confirmation message is then sent to the coordinator at S314.

The coordinator waits to receive such a confirmation message from each database node of the database instance, which may occur at different points in time. Once all of these confirmation messages are received, the coordinator is aware that each database node is in the critical phase. The coordinator then sends another message to all of the database nodes, which is received by each node at 316.

Modified pages may have accumulated in the cache of a database node during the period between termination of the flushing of S308 and blocking of the updates at S312. These modified pages are copied to a staging area (e.g., a temporary memory buffer) at S318, because updates to the datastore are blocked at this point of process 300.

Due to the execution of the repetitive flush at S308, the number of modified pages copied to the staging area during the critical phase is reduced in contrast to other proposed systems. Accordingly, in comparison to the backup systems described in the Background, some embodiments reduce the impact on concurrent write operations by limiting the time spent in the critical phase.

Next, at S320, the current log position is determined and saved. Log replay will start from this position during recovery based on the current backup. Updates to the database node are unblocked at S322. In some embodiments of S322, the consistent change lock is released and the transaction manager is instructed to allow transactions to start and close.

The pages copied to the staging area are written to the datastore at S324. This writing proceeds as described with respect to S304 and S308 (i.e., releasing the previous "last known good" versions of these data pages and marking the newly-written pages as "last known good"). The log queue is also written to the datastore up to the log position saved at S320.

Figure 6:
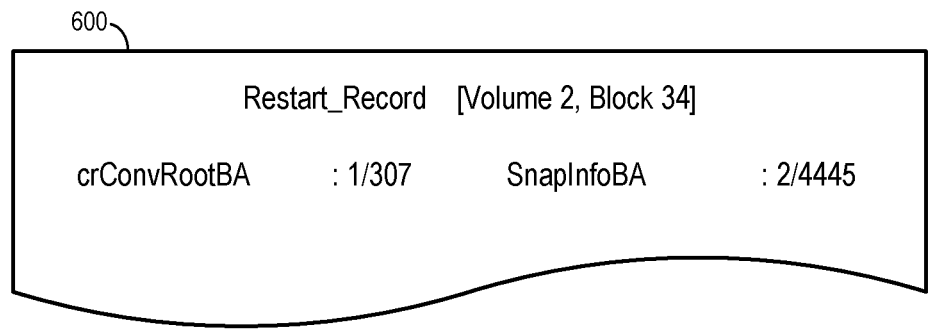
FIG. 6 illustrates a portion of a restart record of a database node according to some embodiments.

At S326, a new restart record is written to the datastore. FIG. 6 illustrates Restart_Record 600 according to some embodiments. As shown, Restart_Record 600 is written to Volume 2, Block 34 of the datastore, and includes members crConvRootBA and SnapInfoBA. The value of crConvRootBA references a location of the root page of the "last known good" converter, and the value of SnapInfoBA references a location of a page which lists snapshot restart records of all snapshots of the database node.

Figure 7:
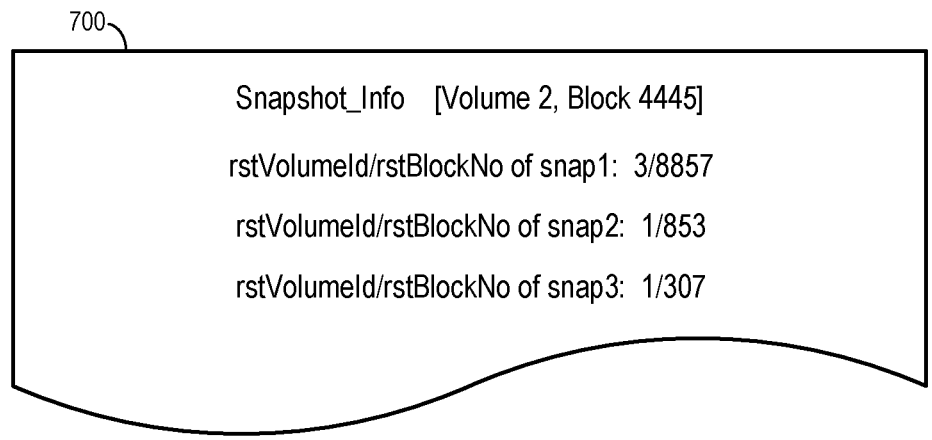
FIG. 7 illustrates a portion of a snapshot information page of a database node according to some embodiments.

For example, Snapshot_Info page 700 indicates the block address of each snapshot's converter root page. As shown, the snapshot restart record (i.e., 1/307) of the just-created snapshot (i.e., snap3) is identical to "last known good" converter root page of the most-recent savepoint, which, at the time represented in FIGS. 6 and 7, is the savepoint at which the snapshot was created.

Figure 8:
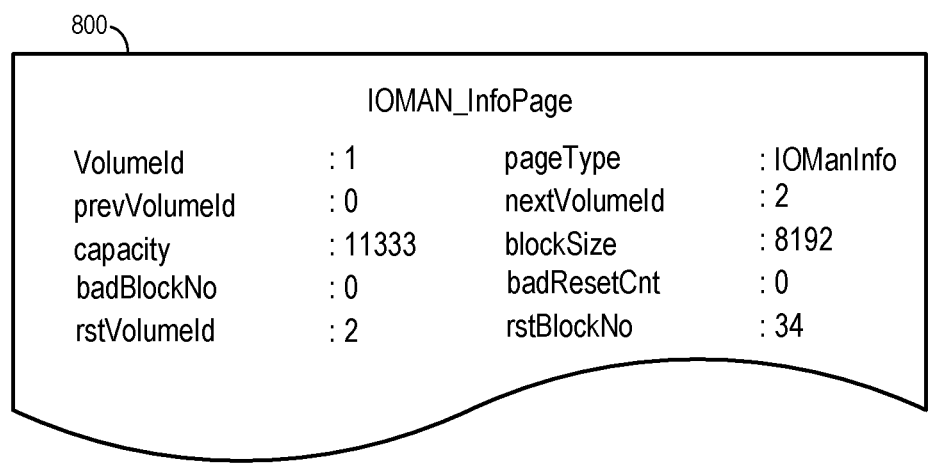
FIG. 8 illustrates a portion of an I/O management page of a database node according to some embodiments.

An anchor page pointing to the restart record is written at S328. For example, IOMan_InfoPage 800 of FIG. 8 includes, among other members, rstVolumeId and rstBlockNo fields to identify a location of Restart_Record 600. Embodiments are not limited to the members and or member values illustrated in FIGS. 6 through 8.

By virtue of the foregoing, the stored "last known good" pages of each database node, taken together, represent a transactionally-consistent state of the full database instance. Moreover, these "last known good" pages are associated with respective snapshots of each database node and are therefore persisted and easily accessible.

Next, at S330, the pages of the snapshot are written to persistent media. In one particular example, the anchor page is used to identify the location of the restart record, which is in turn used to determine the location of the snapshot info page. The converter root page of the latest snapshot is identified from the snapshot info page, and is used to identify all "last known good pages" of the snapshot. These "last known good" pages are written to the persistent media at S330.

The persistent media may be physically-removable from the database node in order to decouple the risk exposure of the backup and the database node. Each database node may write the pages of the snapshot to a dedicated persistent media, or two or more (e.g., all) of the database nodes may write their snapshot pages to a same persistent media.

In order to restore the full database to a consistent state, each node is independently restored to its prior state using its stored snapshot. Based on this consistent state, and if a log exists in the snapshot of each node, log replay can be activated independently within each node to further bring the full database back to the last-committed consistent state.

Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

Embodiments described herein are solely for the purpose of illustration. Those in the art will recognize other embodiments may be practiced with modifications and alterations to that described above.

What is claimed is:

1. In an executing database instance including a plurality of database nodes, a method to create a backup of the executing database instance, comprising:

receiving, at a node of an executing database instance, an instruction to create a snapshot of a previous last known good data page, wherein the snapshot includes: application data, at least one converter leaf page that represents a last known good converter page, and a plurality of converter index pages, wherein the each converter index page is operative to locate the at least one converter leaf page, and to locate an associated data page based on the located at least one converter leaf page, wherein a first converter index page includes block addresses of one or more other index pages and a second converter index gage includes block addresses of at least one other converter leaf page, and wherein the previous last known good data page of the snapshot includes a tag that marks the previous last known good data page with an instruction to maintain the previous last known good data page until a command to remove the snapshot is received;

writing one or more modified pages in a cache to a datastore of the database node;

receiving the command to remove the snapshot;
releasing, based on the received command, the snapshot of the previous last known good pages in the cache, wherein the previous last known good pages are associated with a same logical page number as the one or more modified pages;
re-populating the cache with one or more second written modified pages;
designating the one or more second written modified pages as last known good pages; and
repeatedly releasing last known good pages in the cache and designating the one or more second written modified pages as last known good pages until an instruction to enter a critical phase at the node is received from a coordinator.

2. The method according to claim 1, wherein the instruction to create the snapshot is received from the coordinator.

3. The method according to claim 2, further comprising:
transmitting a confirmation message from the node to the coordinator.

4. The method according to claim 1, further comprising:
repopulating the cache with one or more data pages after the second written one or more modified pages are designated as last known good pages.

5. The method according to claim 1, further comprising:
terminating the repeated release; and
blocking updates to the node in response to receipt of the instruction to enter the critical phase.

6. The method according to claim 5, further comprising:
copying accumulated modified pages to a staging area, wherein the accumulated pages are accumulated in the cache of the node during the period between terminating the repeated release and blocking updates.

7. The method according to claim 6, further comprising:
determining a current log position; and
saving the determined current log position.

8. The method according to claim 6, further comprising:
writing the accumulated pages from the staging area to the datastore.

9. The method of claim 1, wherein the one or more modified pages are written to a same data volume as the modified pages were written to prior to the modification.

10. The method of claim 1, further comprising:
creating a snapshot restart record after receiving in the instruction to create the snapshot.

11. A system comprising:
a first database node of a database instance comprising a plurality of database nodes, the first database node comprising:
a first datastore;
a first cache;
a first processor and memory containing program code of a first distributed database process, the first processor executing the program code to:
create a current backup of the executing database instance by:
receiving, at a node of an executing database instance, an instruction to create a snapshot of a previous last known good data page, wherein the snapshot includes: application data, at least one converter leaf page that represents a last known good converter page, and a plurality of converter index pages, wherein each converter index page is operative to locate the at least one converter leaf page, and to locate an associated data page based on the located at least one converter leaf page, wherein a first converter index page includes block addresses of one or more other index pages and a second converter index page includes block addresses of at least one other converter leaf page, and wherein the previous last known good data page of the snapshot includes a tag that marks the previous last known good data page with an instruction to maintain the previous last known good data page until a command to remove the snapshot is received;
writing one or more modified pages in a cache to a datastore of the database node;
receiving the command to remove the snapshot;
releasing, based on the received command, the snapshot of the previous last known good pages in the cache, wherein the previous last known good pages are associated with a same logical page number as the one or more modified pages;
re-populating the cache with one or more second written modified pages;
designating the one or more second written modified pages as last known good pages; and
repeatedly releasing last known good pages in the cache and designating the one or more second written modified pages as last known good pages until an instruction to enter a critical phase at the node is received from a coordinator.

12. The system according to claim 11, the first processor further executing program code to:
transmit a confirmation message from the node to the coordinator.

13. The system according to claim 12, the first processor further executing program code to:
repopulate the cache with one or more data pages after the second written one or more modified pages are designated as last known good pages.

14. The system according to claim 12, the first processor further executing program code to:
terminate the repeated release; and
block updates to the node in response to receipt of the instruction to enter the critical phase.

15. The system according to claim 14, the first processor further executing program code to:
copy accumulated modified pages to a staging area, wherein the accumulated pages are accumulated in the cache of the node during the period between terminating the repeated release and blocking updates.

16. The system according to claim 15, the first processor further executing program code to:
determine a current log position; and
save the determined current log position.

17. The system according to claim 15, the first processor further executing program code to:
write the accumulated pages from the staging area to the datastore.

* * * * *